United States Patent

Tyler

[11] 4,208,785
[45] Jun. 24, 1980

[54] METHOD OF MAKING ELECTRICAL HEATER CONSTRUCTION

[75] Inventor: Hugh J. Tyler, Santa Ana, Calif.

[73] Assignee: Robertshaw Controls Company, Richmond, Va.

[21] Appl. No.: 950,379

[22] Filed: Oct. 11, 1978

Related U.S. Application Data

[62] Division of Ser. No. 808,269, Jun. 20, 1977, Pat. No. 4,131,789.

[51] Int. Cl.² ............................................. H05B 3/06
[52] U.S. Cl. .................................................. 29/611
[58] Field of Search .................. 29/611, 613, 610, 592; 219/321, 403, 413, 483, 486, 510, 517, 532, 536, 537, 541; 165/39; 337/245

[56] References Cited

U.S. PATENT DOCUMENTS

| | | | |
|---|---|---|---|
| 3,435,189 | 3/1969 | Manecke | 219/321 |
| 3,548,154 | 12/1970 | Christiansson | 219/403 |
| 3,697,727 | 10/1972 | Neuman | 219/537 |
| 3,770,939 | 11/1973 | Kokjohn | 219/532 |
| 3,912,904 | 10/1975 | Phifer | 219/413 |
| 3,912,906 | 10/1975 | McIntosh | 219/483 |
| 4,007,780 | 2/1977 | Caldwell | 165/39 |
| 4,076,975 | 2/1978 | Tyler | 219/483 |

Primary Examiner—Francis S. Husar
Assistant Examiner—Gene P. Crosby
Attorney, Agent, or Firm—Candor, Candor & Tassone

[57] ABSTRACT

An electrical heater construction having a frame carrying electrical heaters and a movable drawer-like unit that is adapted to interconnect power source leads to the heaters when the unit is in one position thereof relative to the frame, the frame carrying a movable latch member that is operatively associated with the unit to latch the unit in an out position thereof when the unit is moved out of the one position thereof to the out position to disconnect the power source leads from the heaters whereby the unit cannot be moved in any direction from the out position thereof until the unit is unlatched from the latch member by the latch member being manually moved to an unlatching position thereof.

5 Claims, 11 Drawing Figures

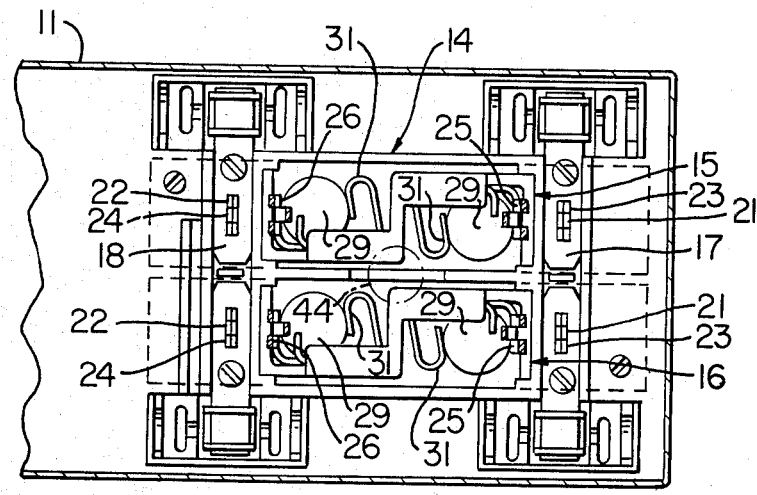
FIG. 8
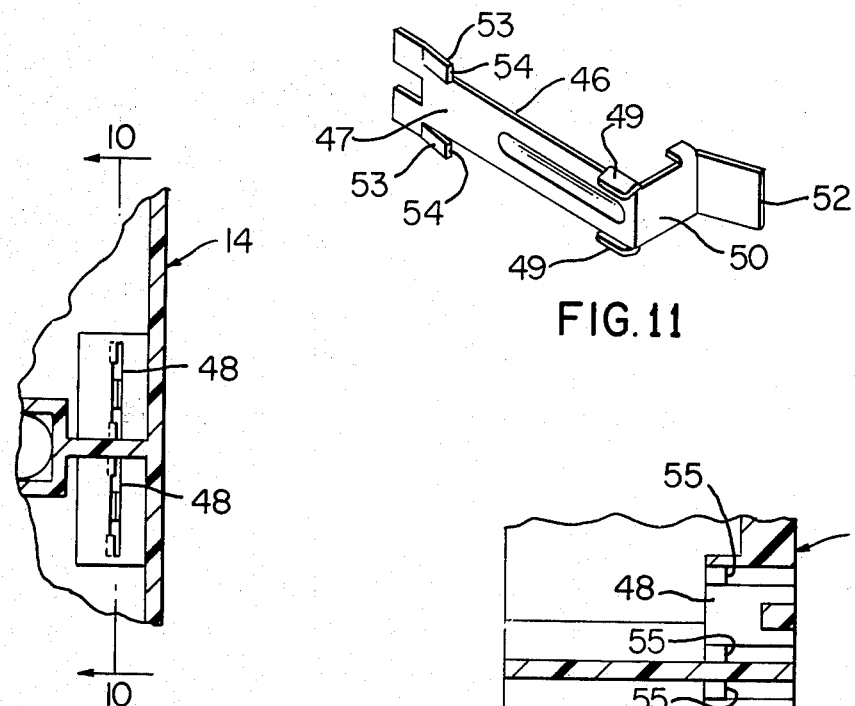
FIG. 9
FIG. 11
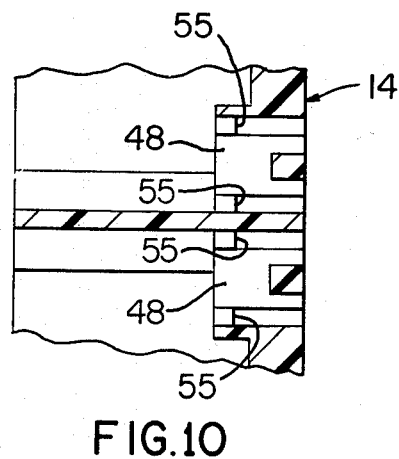
FIG. 10

METHOD OF MAKING ELECTRICAL HEATER CONSTRUCTION

This application is a divisional patent application of its copending parent patent application Ser. No. 808,269 filed June 20, 1977, now U.S. Pat. No. 4,131,789, issued Dec. 26, 1978.

This invention relates to an improved electrical heater construction and method for making the same.

It is well known that electrical heater constructions have been provided for electrical furnaces and the like wherein each electrical heater construction includes control means for interconnecting power source leads to the heater elements thereof.

For example, the copending patent application, Ser. No. 661,056, filed Feb. 25, 1976, now U.S. Pat. No. 4,076,975, discloses and claims an improved electrical heater construction that has a frame means carrying a plurality of electrical heaters and a control means therefor. A rigid lead module is carried by the frame means and has rigid lead means directly and electrically interconnected to the terminals of the heaters and the control means, the rigid lead module itself having terminal means for electrically interconnecting the rigid lead means thereof to power source leads whereby the power source leads will be directly and electrically interconnected to the terminal means of the heaters and the control means by the rigid lead means. In this manner, external wiring for the control system is held to an absolute minimum. The rigid lead module includes a plurality of drawer-like units or sections that contain fuse means in the rigid lead means thereof, the drawer-like units when pulled from an "in" position thereof, disconnecting the main power source leads from the terminal means of the electrical heaters and the control means to terminate the operation thereof.

It was found according to the teachings of the copending patent application Ser. No. 789,814, filed Apr. 22, 1977, now U.S. Pat. No. 4,168,425, that it is desirable to automatically move such fuse drawer-like units to electrical disconnecting positions thereof should the temperature of the heater means reach an unsafe condition thereof. Accordingly, such copending patent application teaches and claims the use of a temperature responsive power means that is carried by the frame means of the previously described electrical heater construction and is operatively associated with the drawer-like units to move the drawer-like units out of the one position thereof to disconnect the lead means from the terminal means of the heater means and the control means when the temperature responsive means senses a certain temperature. Such temperature responsive power means can comprise a piston and cylinder type of temperature responsive device and thus be of the type that has been provided for operating valve members, heating and cooling duct dampers, greenhouse windows, etc. For example, see the U.S. Pat. No. 4,007,780 to Caldwell et al.

While it had been suggested that in the operation of such electrical heater construction that some means should be provided to tend to hold the drawer-like units in their disconnected conditions after the temperature responsive power means had moved the same to their disconnecting position, no means were suggested or provided for positively locking the drawer-like units in their disconnected condition. In particular, detent means were suggested, but such detent means could be accidentally overridden whereby the disconnected drawers could accidentally be bumped back into their electrically connecting condition.

Accordingly, it is a feature of this invention to provide latching means that will positively lock the drawer-like units in their disconnected positions so that the same cannot be moved in any direction from their locked positions until the drawer-like units are manually unlocked from their locked positions.

In this manner, it can be seen that the locking means will prevent such drawer-like units from being pushed out of the electrical heater construction by the temperature responsive means onto the floor or the like, will provide a safe storage position for the drawer-like units by preventing accidental bumping that would reconnect the power source to the heaters unintentionally, and if the electrical heater construction is mounted with the drawer-like units pointing upwardly, such locking feature of this invention will prevent the drawer-like units from reconnecting the power source to the heater means after the temperature responsive means cools.

In particular, one embodiment of this invention provides an electrical heater construction having electrical heater means carried by frame means and having a lead unit movably carried by the frame means and having lead means directly and electrically interconnected to the terminal means of the heater means when the unit is in one position relative to the frame means, the frame means having terminal means for electrically interconnecting the lead means of the unit to power source leads so that the power source leads will be directly and electrically interconnected to the terminal means of the heater means by the lead means when the unit is in the one position thereof. Movable latch means is carried by the frame means and is operatively associated with the unit to latch the unit in an out position thereof when the unit is moved out of the one position thereof to the out position to disconnect the lead means from the terminal means of the heater means whereby the unit cannot be moved in any direction from the out position thereof until the unit is unlatched from the latch means by the latch means being manually moved to an unlatching position thereof.

Accordingly, it is an object of this invention to provide an improved electrical heater construction having one or more of the novel features of this invention as set forth above or hereinafter shown or described.

Another object of this invention is to provide an improved method of making such an electrical heater construction or the like, the method of this invention having one or more of the novel features of this invention as set forth above or hereinafter shown or described.

Other objects, uses and advantages of this invention are apparent from the reading of this description which proceeds with reference to the accompanying drawings forming a part thereof and wherein:

FIG. 8 is a fragmentary cross-sectional view taken on line 8—8 of FIG. 6.

FIG. 9 is a fragmentary cross-sectional view taken on line 9—9 of FIG. 5.

FIG. 10 is a fragmentary cross-sectional view taken on line 10—10 of FIG. 9.

FIG. 11 is a perspective view of the improved latch member of this invention.

Figure 1:
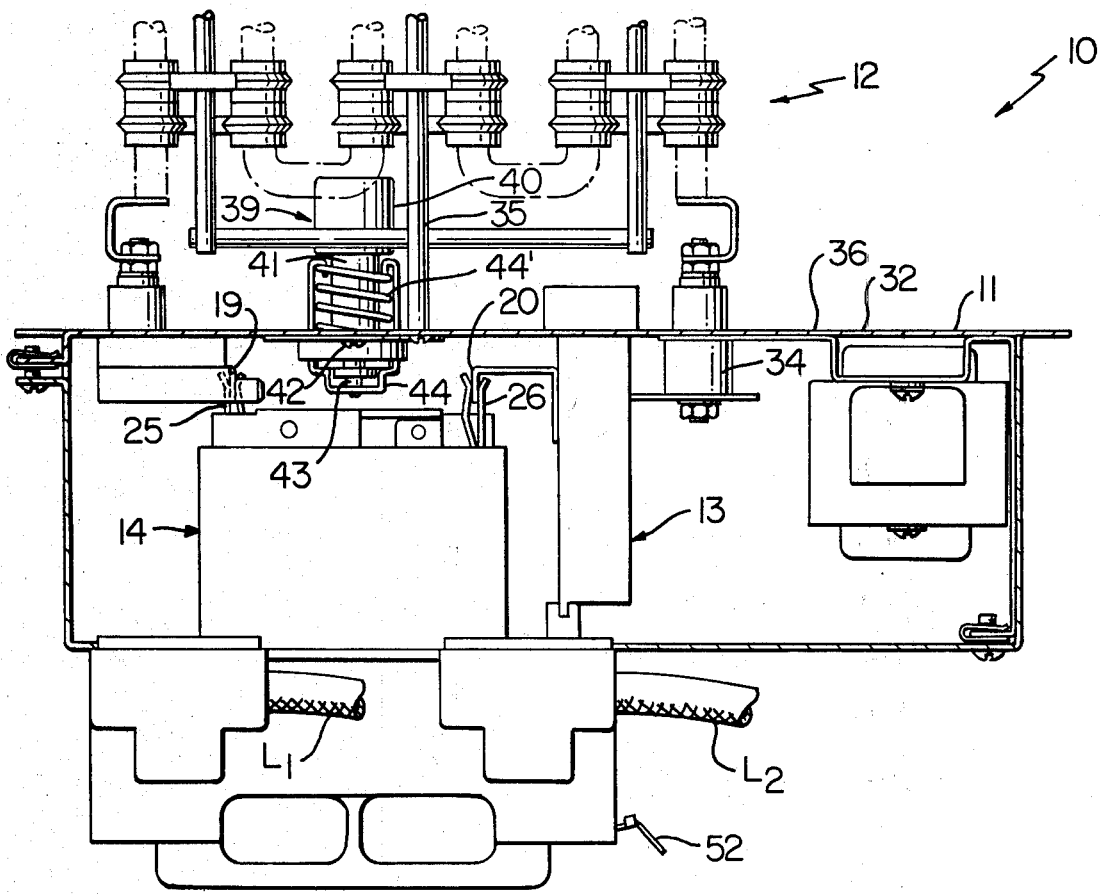
FIG. 1 is a fragmentary, partial cross-sectional top view of the improved electrical heater construction of this invention.

While the various features of this invention are hereinafter illustrated and described as being particularly adapted to provide an electrical heater construction for an electrical furnace, it is to be understood that the various features of this invention can be utilized singly or in any combination thereof to provide an electrical heater construction for other devices as desired.

Therefore, this invention is not to be limited to only the embodiment illustrated in the drawings, because the drawings are merely utilized to illustrate one of a wide variety of uses of this invention.

Figure 2:
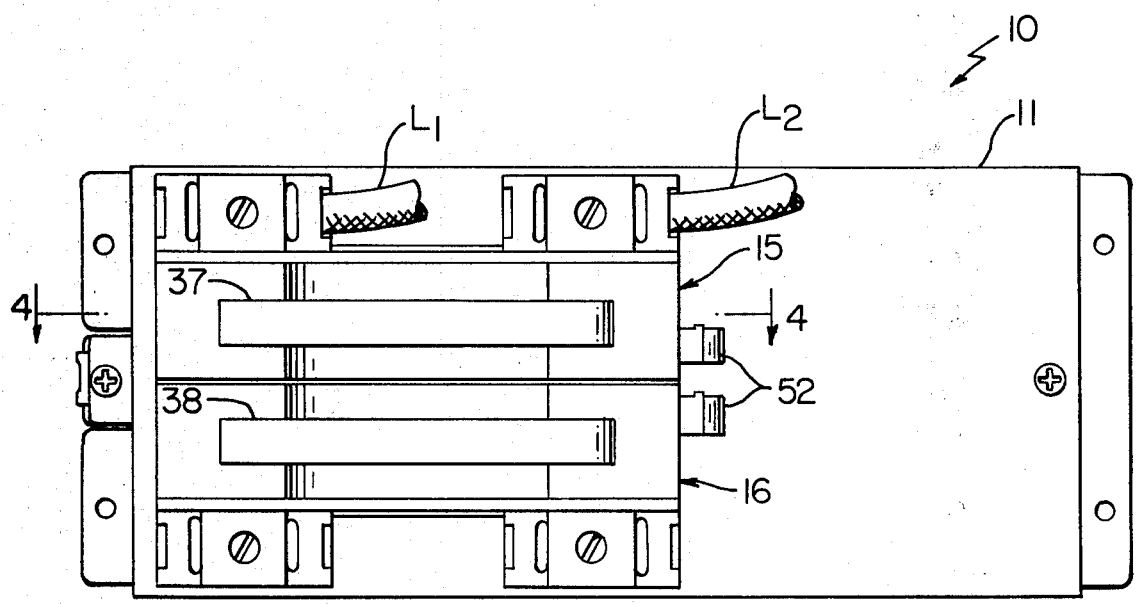
FIG. 2 is a front view of the heater construction of FIG. 1.

Referring now to FIGS. 1 and 2, the improved electrical construction of this invention for an electrical furnace or the like is generally indicated by the reference numeral 10 and comprises a frame means 11 adapted to be secured in an electrical furnace or the like in such a manner that a unit of one or more electrical heaters that is generally indicated by the reference numeral 12 is carried by the frame means 11 so as to be disposed within the heating chamber of the furnace to provide heat when the electrical heater unit or means 12 is effectively interconnected to power source leads L1 and L2 by an electrical sequencing switch construction that is generally indicated by the reference numeral 13 in FIG. 1 and is also carried by the frame means 11.

Since the general construction and operation of the electrical heater construction 10 of this invention is the same as that described and claimed in the aforementioned U.S. Pat. Nos. 4,076,957 and 4,168,425 the details of the structure and operation of the electrical construction 10 need not be fully set forth in this application as the copending patent applications can be referred to for such information, if necessary.

Thus, it is believed that only the general features of the electrical construction 10 need now be described in order to understand the improved features of this invention.

Figure 6:
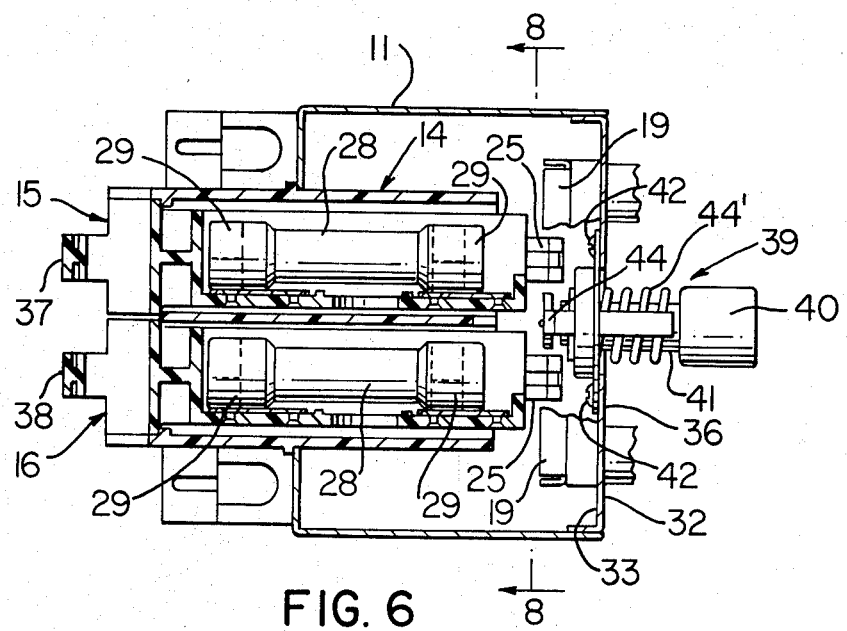
FIG. 6 is a cross-sectional view taken on line 6—6 of FIG. 4.
Figure 7:
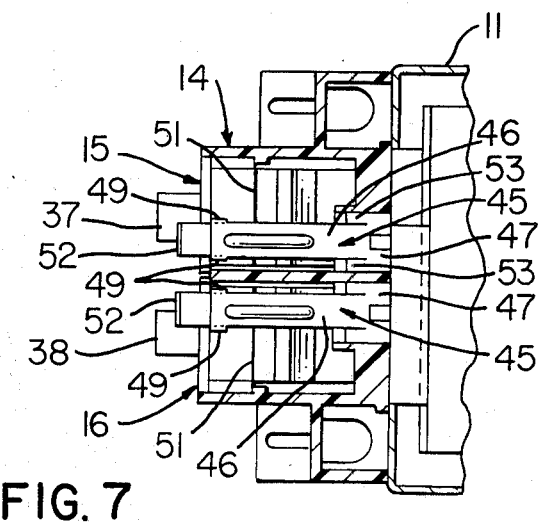
FIG. 7 is a fragmentary cross-sectional view taken on line 7—7 of FIG. 4.
Figure 4:
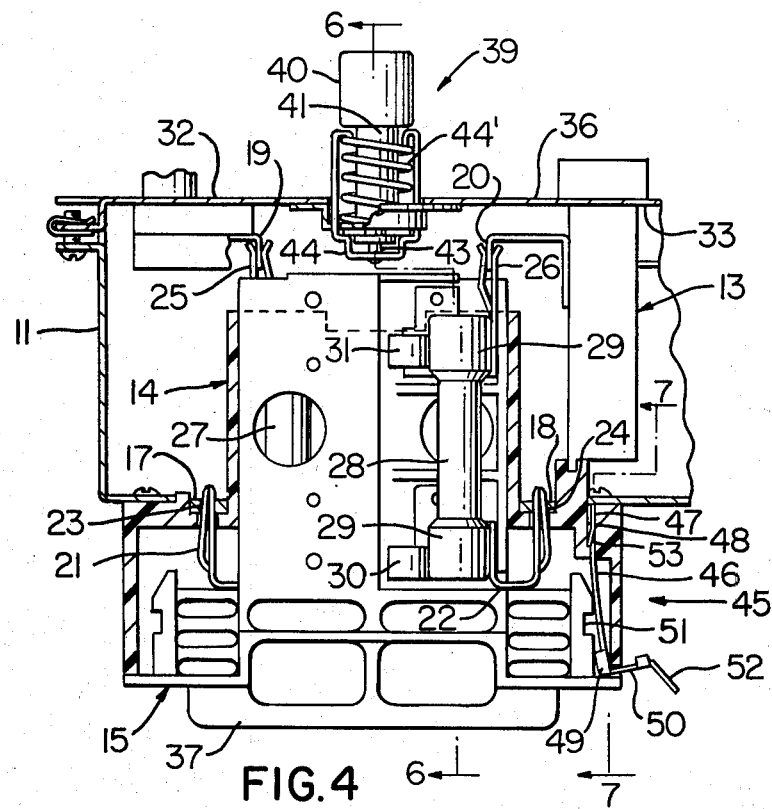
FIG. 4 is a fragmentary cross-sectional view taken on line 4—4 of FIG. 2.

In particular, the frame means 11 includes a housing means or module 14 that contains two movable drawer-like members or units that are generally indicated by the reference numerals 15 and 16 and each of which is adapted to be disposed in an "in" position of the housing means 14 in the manner illustrated in FIGS. 4 and 6 to electrically interconnect a pair of bus-bar terminals 17 and 18 carried by the housing means 14 to L-shaped terminal means 19 and 20 respectively of the heater means 12 and control means 13. However, when the drawer means 15 and 16 are either manually or automatically pulled or moved outwardly relative to the housing means 14 in the manner hereinafter described, the same disconnect the bus-bar terminal means 17 and 18 respectively from the L-shaped terminals 19 and 20 of the heater means 12 and control means 13 in the manner illustrated in FIG. 5.

Figure 5:
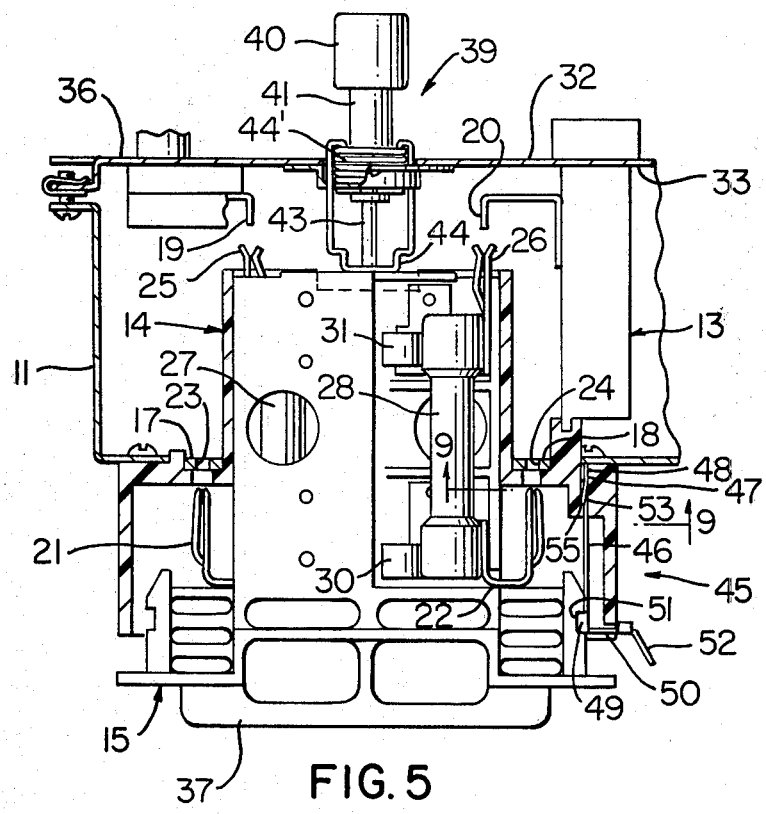
FIG. 5 is a view similar to FIG. 4 and illustrates the drawer units after the same have been moved to disconnecting positions thereof.

Each drawer-like unit 15 and 16 has a pair of looped rigid lead means 21 and 22 which are respectively adapted to be engageably received through opening means 23 and 24 in the bus-bar terminal means 17 and 18 when the respective drawer 15 or 16 is disposed in the "in" condition as illustrated in FIG. 4, such rigid lead means 21 and 22 being out of electrical contact with the terminal means 17 and 18 when the respective drawer 15 or 16 is in the "out" condition as illustrated in FIG. 5.

Similarly, each drawer 15 and 16 is provided with a pair of rigid lead means 25 and 26 which are respectively adapted to be disposed in electrical connection with the respective terminal means 19 and 20 of the heater means 12 and control means 13 when the respective drawer means 15 or 16 is disposed in the "in" condition of FIG. 4 while being out of electrical contact therewith when the drawer means 15 or 16 is in the "out" condition as illustrated in FIG. 5.

Each drawer-like unit 15 and 16 carries a pair of electrical fuses 27 and 28 which respectively electrically interconnect the rigid lead means 21 and 22 to the rigid lead means 25 and 26 thereof through the cooperating ends 29 of the fuses 27 and 28 and the conductive clips 30 and 31 that are carried by the respective drawer 15 or 16 and are electrically interconnected to the respective lead means 21, 22 and 25, 26 as illustrated.

Figure 3:
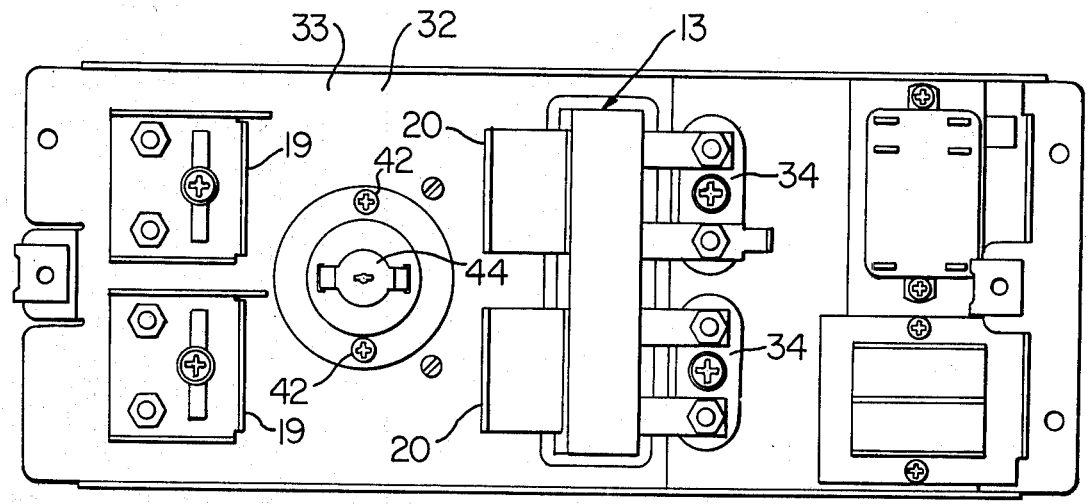
FIG. 3 is a view similar to FIG. 2 with the front cover and fuse module thereof removed.

As illustrated in FIG. 3, the frame means 11 includes a main frame plate 32 which carries the control means 13 on one side 33 thereof as well as the upper and lower terminals 19 of the electrical heater means 12 respectively for the drawer-like units 15 and 16, the control means 13 having upper and lower terminal means 20 for respectively being interconnected to the drawers 15 and 16. The terminals 19 of the plate 32 are interconnected to one side of the heater means 12, the other side of the heater means 12 being interconnected through connector means 34 to the control means 13 and, thus, from the control means 13 to the terminal means 20.

In this manner, external power source leads L1 and L2 that are interconnected to the housing means 14 of the framing means 11 are respectively electrically interconnected to the bus-bar terminal means 17 and 18 so that in order for electrical current to flow between the power source leads L1 and L2 through the heater means 12, not only must the control means 13 interconnect the terminal means 20 thereof to its side of the heater means 12, but also the drawer means 15 and 16 must be in the "in" condition of FIGS. 4 and 6 to respectively interconnect the bus-bar terminals 17 and 18 to the terminals 19 and 20 through the fuses 27 and 28 thereof. Thus, the power source leads L1 and L2 are respectively interconnected to the terminals 19 and 20 of the heater means 12 and the control means 13 for the reasons fully advanced in the aforementioned copending patent applications for operating the electrical furnace or the like.

The heater means 12 is interconnected to the frame plate 32 by a suitable bracket means 35 so as to be disposed on the other side 36 of the frame plate 32.

While the operator of the electrical construction 10 of this invention can readily pull out the drawer units 15 and 16 from the housing means 14 by grasping the handle-like portions 37 and 38 of the drawers 15 and 16 to remove such drawers from the housing means 14 in a manner hereinafter described to change blown fuses 27 and 28 or otherwise repair the construction 10 as the case may be, it can be seen that when the drawers 15 and 16 are moved outwardly to approximately the position illustrated in FIG. 5, the electrical connection of the power source leads L1 and L2 to the heater means 12 and control means 13 is completely broken so that the heater means 12 cannot be operated unless the drawers 15 and 16 are in their fully "in" position in the housing means 14 in the manner illustrated in FIGS. 4 and 6 for the reasons previously set forth.

As previously stated, one of the features of the invention of the aforementioned U.S. Pat. No. 4,168,425 is to automatically move the drawer means 15 and 16 to the open position of FIG. 5 should the temperature of the heater means 12 reach an unsafe limit thereof.

Accordingly, a temperature responsive power means that is generally indicated by the reference numeral 39 is carried by the frame means 11 to force the drawers 15 and 16 from their electrically interconnecting condition of FIGS. 4 and 6 to their electrically disconnecting condition of FIG. 5 when the power means 39 senses an unsafe temperature.

In particular, the temperature responsive power means 39 comprises a piston and cylinder device 40 having a stepped cylinder portion 41 secured to the frame plate 32 by suitable fastening means 42 while the piston portion 43 of the device 40 extends through a suitable opening in the frame plate 32 to project beyond the side 33 thereof and carries an abutment means 44 on the outer end to abut against both of the drawer-like units 15 and 16 in the manner illustrated in FIG. 5 and move the same outwardly relative to the housing means 14 when the piston 43 is extended out of the cylinder portion 41 by a suitable wax charge or the like therein being expanded by the temperature thereof having reached the unsafe level when the heater means 12 is in a run-away condition or the like.

Thus, it can be seen that it is a relatively simple operation to mount the temperature responsive device 40 to the frame means 11 of the electrical heater construction 10 of this invention so that the cylinder portion 41 thereof extends from the side 36 of the frame plate 32 to closely adjacent the heater means 12 and thereby readily sense the temperature thereof while the piston portion 43 thereof extends from the side 33 of the plate 32 to closely adjacent the fuse drawer units 15 and 16 to force the same out of their electrical interconnecting condition should the temperature being sensed by the device 40 exceed a certain safe level.

Once the device 40 has cooled sufficiently to permit the piston portion 43 thereof to retract into the cylinder portion 41 thereof under the force of the compression spring 44' in a manner well known in the art, the drawer-like units 15 and 16 can be pushed back inwardly to their electrically interconnecting conditions of FIGS. 4 and 6 in a manner hereinafter described to again permit operation of the electrical heater construction 10 of this invention.

Therefore, it can be seen that during the normal operation of the electrical heater construction 10 of this invention, the drawer-like units 15 and 16 while in their "in" condition of FIGS. 4 and 6 electrically interconnect the bus-bar terminal means 17 and 18 and, thus, the power source leads L1 and L2 to the terminal means 19 and 20 of the heater means 12 and control means 13 so that the control means 13 can operate the heater means 12 in an on-off cycling manner to tend to maintain the temperature output of the heater means 12 at the temperature setting of the control means 13 in the manner fully set forth in the aforementioned copending patent application.

However, if during such operation of the electrical heater construction 10 of this invention, should the output temperature effect of the heater means 12 exceed a safe level thereof, the wax charge or the like in the cylinder portion 41 of the temperature responsive device 40 expands in such a manner that the same extends the piston portion 43 outwardly relative to the cylinder portion 41 and thus causes the abutment means 44 thereof to act against the drawer-like units 15 and 16 in the manner illustrated in FIG. 5 to move the drawers 15 and 16 outwardly relative to the housing means 14 and thereby break the electrical connection not only between the lead means 21 and 22 and the power source terminal means 17 and 18, but also to break the electrical connection between the lead means 25 and 26 of the drawer-like units 15 and 16 and the terminal means 19 and 20 of the heater means 12 and the control means 13.

As previously stated, it is a feature of this invention to positively lock the drawer-like units 15 and 16 in their out position when the same have been moved in the above manner by the temperature responsive device 40 so that such out drawer-like units 15 and 16 must be positively unlocked from their out condition before the same can be used to again interconnect the power source leads L1 and L2 to the heater means 12.

In this manner, in order for the operator to again operate the heater means 12 of the electrical heater construction 10 after the drawer-like units 15 and 16 have been moved outwardly and locked in such outward condition, not only must the device 40 return to a safe temperature thereof, but also the drawer-like units 15 and 16 must be manually unlocked from their out position and then be manually moved back into the "in" condition thereof. Thus, the operator, before returning the drawers 15 and 16 to the "in" condition, will check out the electrical heater construction 19 to determine just what caused the heater malfunction and, thus, cause the device 40 to open the drawers 15 and 16 in the manner previously described so that such problem can be corrected.

The latch means of this invention for locking the drawer-like units 15 and 16 in their out condition is generally indicated by the reference numeral 45 and an identical locking unit 45 is provided for each drawer 15 and 16 so that only the locking means for the drawer 15 will be described with the understanding that the same locking means 45 and operation thereof applies to the drawer 16.

The locking means 45 comprises a one-piece leaf-like spring member 46 having one end 47 snap-fittingly carried in a slot means 48 of the frame means 14 in the manner hereinafter described so that the natural bias of the leaf-like spring member 46 tends to urge a pair of locking tabs 49 at the other end 50 of the member 46 inwardly towards the drawer 15. In this manner, when a locking notch or groove 51 of the drawer 15 is aligned with the locking tabs 49 in the manner illustrated in FIG. 5, the force of the leaf-like spring member 46 snaps the locking tabs 49 into the recess 51 to positively lock the drawer 15 in the out position of FIG. 5. Thus, the drawer 15, when locked in the position of FIG. 5, cannot be moved either inwardly or further outwardly as the same is positively locked in the out position of FIG. 5 whereby the drawer 15 has fully disconnected not only the lead means 21 and 22 thereof from the bus-bar terminal means 17 and 18 of the frame means 14, but also the drawer 15 has disconnected the lead means 25 and 26 thereof from the terminal means 19 and 20 of the heater means 12 and control means 13 as previously described.

Thus, in order for the operator to either further move the drawers 15 and 16 outwardly from the position of FIG. 5 or move the same back inwardly to reconnect the lead means 21, 22, 25 and 26 thereof in the manner illustrated in FIG. 4, the operator must manually pull outwardly on a handle portion 52 of each leaf-like spring member 46 at the ends 50 thereof in order to pull the locking tabs 49 out of the locking recess 51 of the drawers 15 and 16 so that the drawers 15 and 16 can be either pulled further outwardly or pushed inwardly as desired.

Accordingly, it can be seen that when the drawers 15 and 16 are locked in the out position of FIG. 5 by the locking means 45 of this invention, the same will be positively held in such out position of FIG. 5 regardless of whether the drawers 15 and 16 are pointing upwardly, are accidentally bumped, or are attempted to be further forced outwardly by the device 40 whereby suitable overrun means of the device 40 will take over so that the drawers 15 and 16 will not accidentally be forced out on to the floor as would be the case if the positive locking means 45 of this invention were not provided.

As illustrated in FIG. 11, each one-piece leaf-like spring member 46 has a pair of spring tabs 53 angled from the end 47 thereof with the free ends 54 of the spring tabs 53 projecting away from the end 47 and toward the locking tabs 49 thereof.

In this manner, the end 47 of the spring-like member 46 can be inserted into the slot 48 formed in the frame as illustrated in FIGS. 9 and 10 so that once the tabs 53 have passed beyond ledges 55 thereof, the tabs 53 will spring outwardly and the ends 54 thereof will lock behind the ledges 55 of the frame means 14 to positively secure the ends 47 of the spring-like members 46 within the slots 48 of the frame means 14.

Thus, it can be seen that it is a relatively simple operation to secure the locking leaf-like spring members 46 to the frame means 14 so that the leaf-like spring members 46 can be utilized to lock the drawers 15 and 16 in the out positions thereof as illustrated in FIG. 5 and in the manner previously described.

If desired, each drawer 15 or 16 can be provided with the locking notch or recess 51 on both sides thereof as illustrated in FIGS. 4 and 5 so that regardless of which rotational position the drawer 15 or 16 is replaced into the frame means 14, there will always be a notch 51 disposed adjacent the locking leaf-like spring member 46 for the purpose previously set forth.

The operation of the locking means 45 of this invention will now be described.

As previously stated, if during the normal operation of the electrical heater construction 10 of this invention should the device 40 sense an unsafe temperature, the device 40 will extend the piston 43 thereof outwardly relative to the frame plate 32 and push against the drawers 15 and 16 to force the same from their "in" position of FIG. 4 to their out position of FIG. 5. When such drawers 15 and 16 reach the out position illustrated in FIG. 5, the locking tabs 49 of the leaf-like spring members 46 are snapped into the locking recesses 51 thereof to positively hold the drawers 15 and 16 in the out position of FIG. 5.

Thus, in order to further move the drawers 15 and 16 outwardly or back inwardly, the operator must manually pull outwardly on the handle portions 52 of the leaf-like spring members 46 to retract the locking tabs 49 from the locking recesses 51 thereof.

Should the electrical heater construction 10 of this invention be operating in a normal manner, and it is desired merely to remove one or both drawers 15 and 16 thereof, it can be seen that the operator merely can pull outwardly on the handle portions 52 of the leaf-like spring members 46 and then pull outwardly on the drawers 15 and 16 so that the same will not be locked by the leaf-like spring members 46 when the drawers 15 and 16 are being pulled outwardly in a normal manner to change the fuses 27 and 28 thereof or for other purposes as desired.

Therefore, it can be seen that this invention not only provides an improved electrical heater construction, but also this invention provides an improved method of making such an electrical heater construction or the like.

While the form and method of this invention now preferred have been illustrated and described as required by the Patent Statute, it is to be understood that other forms and method steps can be utilized and still fall within the scope of the appended claims.

I claim:

1. In a method of making an electrical heater construction having a frame means carrying electrical heater means and a movable drawer-like unit that is adapted to interconnect power source lead means to said heater means when said unit is in one position thereof relative to said frame means, the improvement comprising the step of securing a movable latch means to said frame means so as to be operatively associated with said unit to latch said unit in an out position thereof when said unit is moved out of said one position thereof to said out position to disconnect said power source lead means from said heater means whereby said unit cannot be moved in any direction from said out position thereof until said unit is unlatched from said latch means by said latch means being manually moved to an unlatching position thereof.

2. A method of making an electrical heater construction as set forth in claim 1 and including the step of forming said latch means from a leaf-like spring member.

3. A method of making an electrical heater construction as set forth in claim 2 and including the steps of forming said unit with a locking recess, and forming said leaf-like spring member with a projection for being received in said locking recess to lock said unit in said out position thereof.

4. A method of making an electrical heater construction as set forth in claim 3 and including the step of securing one end of said leaf-like spring member to said frame means so that the natural bias of said leaf-like spring member tends to force said projection thereof in a direction to be received in said locking recess when said locking recess is aligned therewith.

5. A method of making an electrical heater construction as set forth in claim 4 wherein said step of securing said one end of said leaf-like spring member to said frame means includes the step of snap-fitting said one end in a slot means of said frame means.

* * * * *